Oct. 27, 1964 L. I. BARNES 3,154,086
LIQUID MIXER FOR CAR WASH MACHINE
Filed July 23, 1962
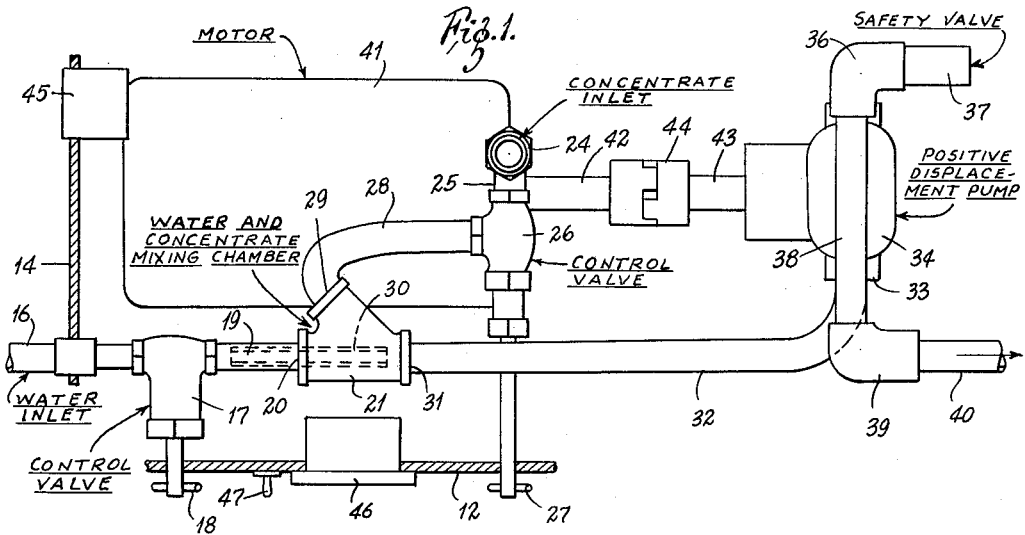
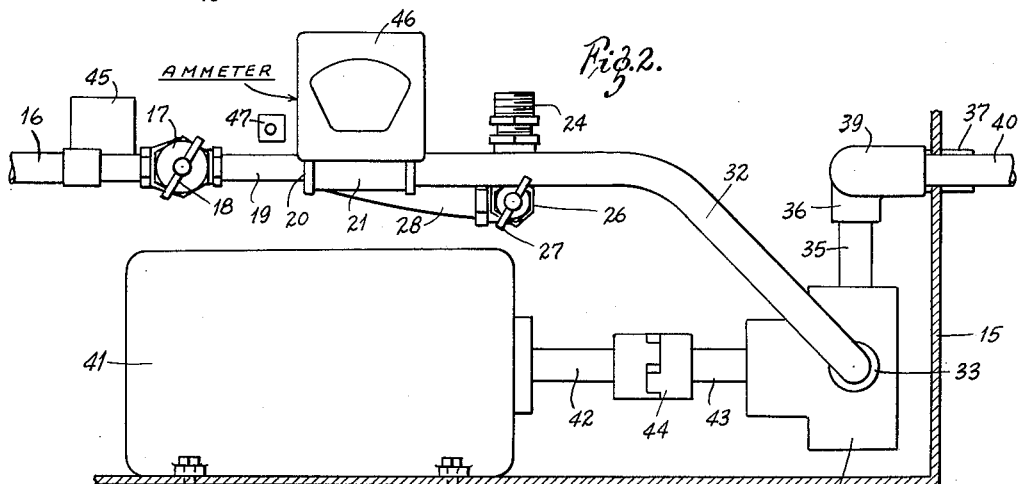
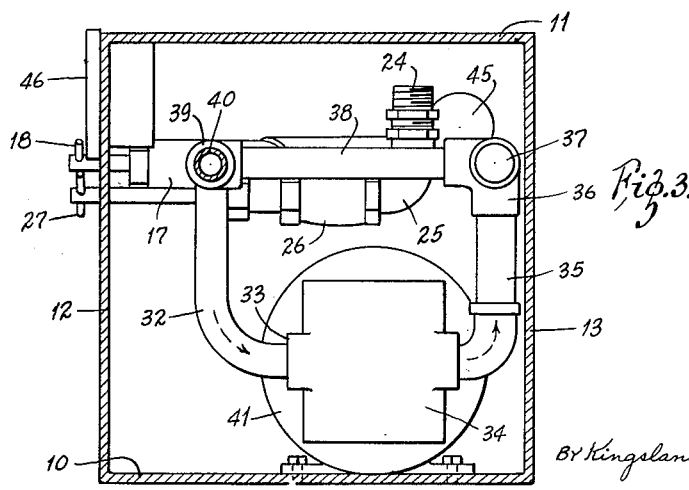
INVENTOR:
LANT I. BARNES,
By Kingsland, Rogers, Ezell & Robbins
ATTORNEYS

United States Patent Office 3,154,086
Patented Oct. 27, 1964

3,154,086
LIQUID MIXER FOR CAR WASH MACHINE
Lant I. Barnes, 10811 Clearbrook Lane, Dallas, Tex.
Filed July 23, 1962, Ser. No. 211,916
4 Claims. (Cl. 137—1)

This invention relates to a portable car wash machine, and particularly to a car wash machine having means for accurately controlling the relative proportions of liquid ingredients pumped from the machine.

In brief, the invention comprises a water pipe and a concentrate pipe for delivering water and concentrate respectively to a liquid mixer. There are control valves for controlling the flow of water and concentrate to the mixer, thus providing control of the relative proportions of water and concentrate. A pipe is connected from the mixer to a motor driven pump which pumps the mixture through an outlet pipe having an appropriate orifice for establishing the output pressure of the liquid, the outlet pipe being connected to a spray nozzle, or the like.

An ammeter is wired to the motor circuit to indicate the load on the motor. When the water control valve is open, and the concentrate valve is closed, the readings on the ammeter indicate the load on the motor caused by pumping water alone. Thereafter, when the concentrate valve is opened an appropriate amount, the reading on the ammeter increases to a predetermined higher level. The water valve and concentrate valve can be regulated according to different predetermined ammeter readings to provide any desired proportions of water and concentrate.

The principal object of this invention is to provide a machine for spraying a mixture of liquids, with means to accurately determine and control the relative proportions of liquid ingredients in the mixture.

A particular object of the invention is to provide a machine for spraying a mixture of liquids including a motor driven pump and pipes to deliver each liquid to the pump, with an ammeter wired to the motor to indicate variations in the load on the motor as different volume rates of the individual liquids flow to the pump.

Still another object of the invention is to provide a machine for spraying liquids, which is especially adaptable to use as a car wash machine, and which is compact, light in weight and portable.

Yet another object of the invention is to provide a machine for spraying liquids, including mixtures of water and concentrate, which is adaptable to a multi-inlet manifold for connection to several different concentrates to permit selection of one or more concentrates to be mixed with water.

Other objects and advantages will be apparent to those skilled in the art.

In the drawing:

The drawing shows three views which schematically illustrate the invention. The housing is shown in sectional wall fragments where advisable to indicate the mounting of parts.

FIGURE 1 is a plan view of the cleaning and spraying machine;

FIGURE 2 is a side elevation view of the machine; and

FIGURE 3 is an elevation view of the right end of FIGURE 2.

Referring now to the drawing, the machine has a housing, indicated in the figures by various wall portions shown in section, including a bottom wall 10, a top wall 11, side walls 12 and 13, and end walls 14 and 15. These walls are joined together at their edges to make a closed housing with various openings for pipes, meters, valves and switches. The entire machine is portable, as indicated by the dimensions of the housing, which is about eighteen inches wide (from wall 14 to wall 15), eleven inches high, and eleven inches deep.

A water inlet pipe 16 extends into the housing through the side wall 14 and is connected to a control valve 17. The other end of the pipe 16 (outside the housing) connects to a standard water faucet under city pressure. An operating handle 18 for the control valve 17 is accessible from outside the housing. A pipe 19 connected to the outlet side of the control valve 17 leads to the water inlet side 20 of a mixing chamber 21.

At another place in the housing, there is a fitting 24 that can be connected to a concentrate container (not shown) within the housing or that can be extended through the wall 11 for connection to a concentrate container outside the housing. The fitting 24 is connected by an elbow 25 to a control valve 26, the control handle 27 of which is accessible from outside the housing. The outlet from the control valve 26 is connected by a pipe 28 to a concentrate inlet 29 to the mixer 21.

The water and detergent are mixed in the mixer 21 in certain proportions under the control of the valves 17 and 26. As shown in the drawing, the fitting or detergent inlet 24 is positioned above the mixer 21 so that the concentrate flows by gravity to the mixer. This flow of concentrate into the mixer is aided by a suitable pressure reducer in the water pipe 19 which may be in the form of a reduced diameter pipe section 30.

The outlet 31 from the mixer is connected by a pipe 32 to the inlet 33 of a double piston pump 34. The pump 34 discharges the mixture of water and detergent concentrate through a pipe 35 that connects to an elbow 36 having an automatic pressure-operated safety valve 37 extending through the side 15 of the housing. From the elbow 36, there is a horizontal pipe 38 connected to another elbow 39, in turn connected to an outlet pipe 40.

The pump 34 is driven by a one horsepower motor 41 having its output shaft 42 connected to the input shaft 43 of the pump through a conventional clutch 44. A conventional socket box 45 extends through the side wall 14 and is wired to the motor 41 and permits convenient plugging of the motor 41 across a standard 110 v. supply.

An ammeter 46 connected to the wall 12 of the housing is wired to the motor 41 by conventional wiring to measure changes in current drawn by the motor. The reading on the ammeter 46 varies as the current drawn by the motor 41 varies with changing on the motor output shaft 42.

Finally, there is an on-off switch 47 mounted on an outer wall 12 of the housing. This switch is connected into the circuit of the motor 41 to permit convenient external control of the machine.

*Operation*

The compactness and relative light weight of this car washing machine allows it to be carried to the best place for use and to be transferred between different places of use. The water inlet pipe 16 is connected to a conventional outlet from the city water supply. The fitting 24 is connected to a tank or other source of detergent concentrate. Then, when the socket box 45 is connected to a standard 110 volt supply, the machine is ready for use.

When the switch 47 is turned on to operate the motor 41, if the valve 17 is open far enough, water will be delivered through the inlet pipe 16, through the mixer 21 and the pipe 32 to the pump 34. At full pump capacity, the water is pumped out through the pipe 40 which has an orifice or orifices of a proper diameter to discharge the water at between 500 and 700 pounds per square inch, at a load on the motor of 12 amperes, as indicated by the ammeter 46. As the valve 17 is closed down, or throttled by operating the handle 18, the load on the motor 41 is reduced, and there is a corresponding drop in the reading on the ammeter 46. At a certain predetermined ammeter reading, for example, 10 amperes, the water valve 17 is set. Then, the concentrate control valve 26 is opened by turning the operating handle 27 to admit concentrate through the pipe 28 into the mixer 21, where it mixes with water and is carried therewith through the pipe 32 to the pump 34. This addition of concentrate raises the load on the pump, and when the ammeter reading 46 again reaches 12 amperes, the concentrate control valve 26 is set. The setting of the water and concentrate valves according to the ammeter readings has provided a specific ratio of concentrate to water, and the mixture of liquids thus established is continually pumped through the pump 34 and out the outlet 40 to the spray nozzle (not shown).

From the foregoing, it can be seen that the ammeter 46 permits visual determination of the proper proportions of water and concentrate. Different proportions of water and concentrate can be obtained by operating the water control valve 17 to produce readings other than 10 amperes on the ammeter 46, and thereafter operating the concentrate control valve 26 to bring the ammeter reading up to the full 12 amperes. A chart, which shows the relationship between ammeter readings and water-to-concentrate proportions, allows the operator to establish any mixture of water and concentrate that he desires.

It should be noted that one of the advantages of this invention is that it may be used with a multi-inlet manifold instead of the pipe 28 leading to the mixer 21. Then, different concentrates, such as detergent, insecticide, and the like, can be connected to the various inlets to the manifold. With proper valve provision, such as solenoid valves, any one of the concentrates may be selected for mixture with water, thus providing a versatile multi-purpose portable spray machine.

Various changes and modifications may be made within the process of this invention as will be readily apparent to those skilled in the art. Such changes and modifications are within the scope and teaching of this invention as defined by the claims appended hereto.

What is claimed is:

1. A car wash machine comprising a motor driven pump for pumping a mixture of first and second liquids, means for delivering the first liquid to the pump, means for delivering the second liquid to the pump, means for independently regulating the rate of flow of the first liquid to the pump, means for independently regulating the rate of flow of the second liquid to the pump, and means for measuring variations upon the pump motor load with independent variations in flow rates of the first and second liquids and of combinations of the first and second liquids to the pump.

2. A portable car wash machine comprising a housing, a liquid pump within the housing, a motor within the housing having its output shaft connected to drive the pump, an inlet to the pump, an outlet from the pump, a liquid mixer within the housing, a water inlet to the mixer, a concentrate inlet to the mixer, an outlet from the mixer, means connecting the mixer outlet to the pump inlet, a water pipe connected to the mixer water inlet for delivering water to the mixer, means to reduce the pressure of water in the mixer below the pressure in the water pipe, a concentrate pipe connected to the mixer concentrate inlet for delivering concentrate to the mixer, means for regulating the rate of water flow to the mixer, means for regulating the rate of concentrate flow to the mixer, the concentrate pipe extending above the mixer to cause flow of concentrate to the mixer by gravity, and means for measuring variations in the load on the motor caused by regulation of either the water or concentrate flow.

3. A method of spraying a mixture of liquids in predetermined proportions comprising the steps of operating a motor driven pump to pump the liquids from separate sources at independent flow rates through a liquid mixer, measuring the load on the motor driven pump corresponding to the flow rate of the combined liquids, and independently requlating the rate of flow to the mixer of each liquid according to predetermined measurements of load on the pump.

4. A method of spraying a mixture of liquids in regulated proportions comprising the steps of operating a motor driven pump to pump the liquids from separate sources through a liquid mixer, indicating the load on the motor driven pump corresponding to the flow rate of liquid from the mixer, completely blocking the flow to the mixer of all but one of the liquids, regulating the flow rate to the mixer of the said one liquid according to an indication of a predetermined first load on the pump, and thereafter unblocking and regulating the flow rate to the mixer of another one of the said liquids according to a measurement of a predetermined second load on the pump.

References Cited in the file of this patent

UNITED STATES PATENTS

| | | |
|---|---|---|
| 1,783,036 | Crawford | Nov. 25, 1930 |
| 2,062,097 | Lingard | Nov. 24, 1936 |
| 2,588,255 | Larsh | Mar. 4, 1952 |
| 2,754,763 | Hofer | July 17, 1956 |
| 2,785,012 | Frewin | Mar. 12, 1957 |
| 2,920,635 | Wilson | Jan. 12, 1960 |